(12) United States Patent
Jones, Jr.

(10) Patent No.: US 8,550,673 B1
(45) Date of Patent: Oct. 8, 2013

(54) SECONDARY LIGHTING SYSTEM FOR MOTORCYCLES

(76) Inventor: William C. Jones, Jr., Wilmington, DE (US)

( * ) Notice: Subject to any disclaimer, the term of this patent is extended or adjusted under 35 U.S.C. 154(b) by 97 days.

(21) Appl. No.: 13/353,451

(22) Filed: Jan. 19, 2012

(51) Int. Cl.
*B60Q 1/00* (2006.01)

(52) U.S. Cl.
USPC .................. 362/464; 362/473; 362/545

(58) Field of Classification Search
USPC ............ 362/473–476, 543–545, 460–469
See application file for complete search history.

(56) References Cited

U.S. PATENT DOCUMENTS

| | | | |
|---|---|---|---|
| 4,024,388 A | 5/1977 | Skoff | |
| 4,363,022 A | 12/1982 | Manacci | |
| 4,583,152 A | 4/1986 | Kawai et al. | |
| 4,868,720 A * | 9/1989 | Miyauchi et al. | 362/466 |
| 4,922,390 A * | 5/1990 | Nakazawa et al. | 362/467 |
| D355,269 S | 2/1995 | Matthies | |
| 5,426,571 A * | 6/1995 | Jones | 362/466 |
| 5,811,656 A * | 9/1998 | Jones | 73/1.75 |
| 6,595,666 B1 * | 7/2003 | Exilien | 362/464 |
| 6,789,928 B2 * | 9/2004 | Khan | 362/500 |
| 7,055,993 B2 | 6/2006 | Farrow et al. | |
| 7,445,364 B2 * | 11/2008 | Gropp et al. | 362/475 |
| 8,398,277 B2 * | 3/2013 | Fritz et al. | 362/464 |
| 2004/0165396 A1 * | 8/2004 | Hatfield, Jr. | 362/473 |
| 2005/0024884 A1 | 2/2005 | Seminara et al. | |
| 2005/0169001 A1 | 8/2005 | Farrow et al. | |

* cited by examiner

*Primary Examiner* — Anne Hines

(57) ABSTRACT

A secondary lighting system for providing light to a motorcycle when the motorcycle tilts in a turn having a light base with a front and a back surface and an inner cavity, a light component in the front surface, a tilt sensor in the inner cavity adapted to detect a tilt angle of a motorcycle, a microprocessor in the inner cavity operatively connected to the tilt sensor and to the light component, wherein when the tilt sensor detects a tilt angle that is greater than a pre-programmed threshold the tilt sensor sends an input signal to the microprocessor whereupon the microprocessor sends an output command to the light component to activate the light component, the light component emits light at a lighting angle.

20 Claims, 5 Drawing Sheets

(Front View)

(ISO View)

(Back View)

(Front View)

FIG. 4 (Side View)

(Front View)

SECONDARY LIGHTING SYSTEM FOR MOTORCYCLES

FIELD OF THE INVENTION

The present invention is directed to a secondary lighting system for motorcycles, more particularly to a lighting system that is activated when the motorcycle leans into a turn so as to help illuminate the path ahead of the vehicle.

BACKGROUND OF THE INVENTION

Riding in dark conditions can be difficult and dangerous for motorcyclists. The present invention features a novel secondary lighting system for motorcycles. The system of the present invention will help increase low-light/night time visibility for motorcyclists, thereby increasing safety for all drivers. The system of the present invention may be installed after-market or during manufacturing of the vehicle.

SUMMARY

The present invention features a secondary lighting system for motorcycles. In some embodiments, the secondary lighting system for providing light to a motorcycle when the motorcycle tilts in a turn, said system comprises a light base having a front surface and a back surface and an inner cavity, a light component disposed in the front surface of the light base; a tilt sensor disposed in the inner cavity of the light base, the tilt sensor is adapted to detect a tilt angle of a motorcycle; a microprocessor disposed in the inner cavity of the light base, the microprocessor is operatively connected to the tilt sensor and to the light component wherein when the tilt sensor detects a tilt angle that is greater than a pre-programmed first threshold the tilt sensor sends a first input signal to the microprocessor whereupon the microprocessor sends a first output command to the light component to activate the light component, the light component emits light at a first lighting angle; wherein when the tilt sensor detects a tilt angle that is greater than a pre-programmed second threshold the tilt sensor sends a second input signal to the microprocessor whereupon the microprocessor sends a second output command to the light component to activate the light component, the light component emits light at a second lighting angle, the second lighting angle being larger than the first lighting angle. In some embodiments, the light component is a light emitting diode (LED).

In some embodiments, the first threshold is between about 15 to 20 degrees. In some embodiments, the first threshold is between about 20 to 25 degrees. In some embodiments, the first threshold is between about 25 to 30 degrees. In some embodiments, the first threshold is between about 30 to 35 degrees. In some embodiments, the second threshold is about 35 degrees. In some embodiments, the second threshold is about 40 degrees. In some embodiments, the first lighting angle is between about 20 to 35 degrees. In some embodiments, the second lighting angle is about 40 degrees.

In some embodiments, the system further comprises a first switch base with a first arming switch that can move between at least an on position and an off position, the first arming switch is operatively connected to the microprocessor, wherein when the first arming switch is in the on position the system is activated and when the first arming switch is in the off position the system is deactivated. In some embodiments, the light base is mounted to a side of a motorcycle.

In some embodiments, a secondary lighting system for providing light to a motorcycle when the motorcycle tilts in a turn comprises a light base having a front surface and a back surface and an inner cavity, a light component disposed in the front surface of the light base; a tilt sensor disposed in the inner cavity of the light base, the tilt sensor is adapted to detect a tilt angle of a motorcycle; a microprocessor disposed in the inner cavity of the light base, the microprocessor is operatively connected to the tilt sensor and to the light component; wherein when the tilt sensor detects a tilt angle that is greater than a pre-programmed first threshold the tilt sensor sends a first input signal to the microprocessor whereupon the microprocessor sends a first output command to the light component to activate the light component.

In some embodiments, the first threshold is between about 15 to 25 degrees. In some embodiments, the first threshold is between about 25 to 35 degrees.

In some embodiments, wherein when the tilt sensor detects a tilt angle that is greater than a pre-programmed first threshold the tilt sensor sends a first input signal to the microprocessor whereupon the microprocessor sends a first output command to the light component to activate the light component, the light component emits light at a first lighting angle. In some embodiments, the first lighting angle is between about 20 to 35 degrees.

In some embodiments, wherein when the tilt sensor detects a tilt angle that is greater than a pre-programmed second threshold the tilt sensor sends a second input signal to the microprocessor whereupon the microprocessor sends a second output command to the light component to activate the light component, the light component emits light at a second lighting angle, the second lighting angle being larger than the first lighting angle. In some embodiments, wherein the second lighting angle is about 40 degrees.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIGS. 1-6, the present invention features a secondary lighting system 100 for motorcycles. The system 100 of the present invention is activated when the driver leans into a turn (e.g., if the bike leans 20 degrees or more), thereby illuminating the path ahead of the vehicle so that the driver can see. In some embodiments, the system 100 (light) is installed on each side of the motorcycle. In some embodiments, the system is integrated in the turn signal assembly or the headlight assembly.

Figure 1:
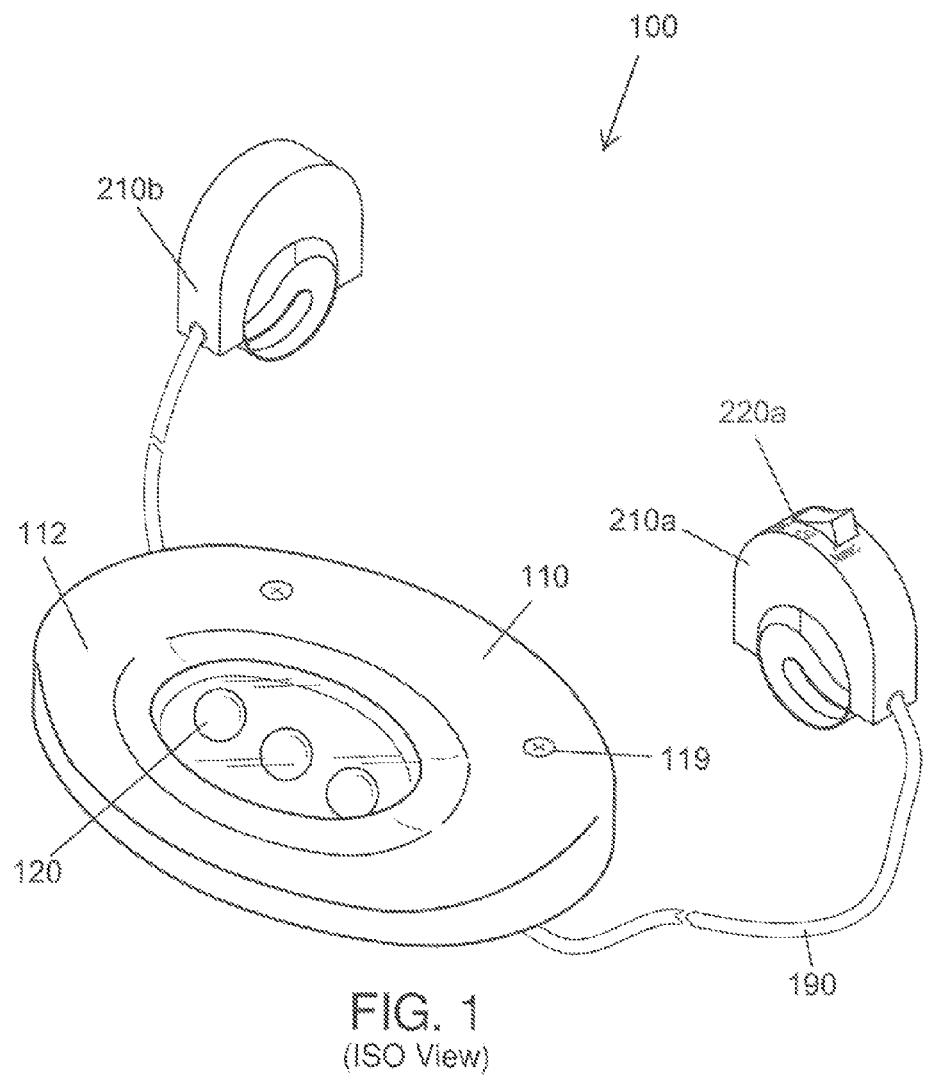
FIG. 1 is a perspective view of the system of the present invention.
Figure 2:
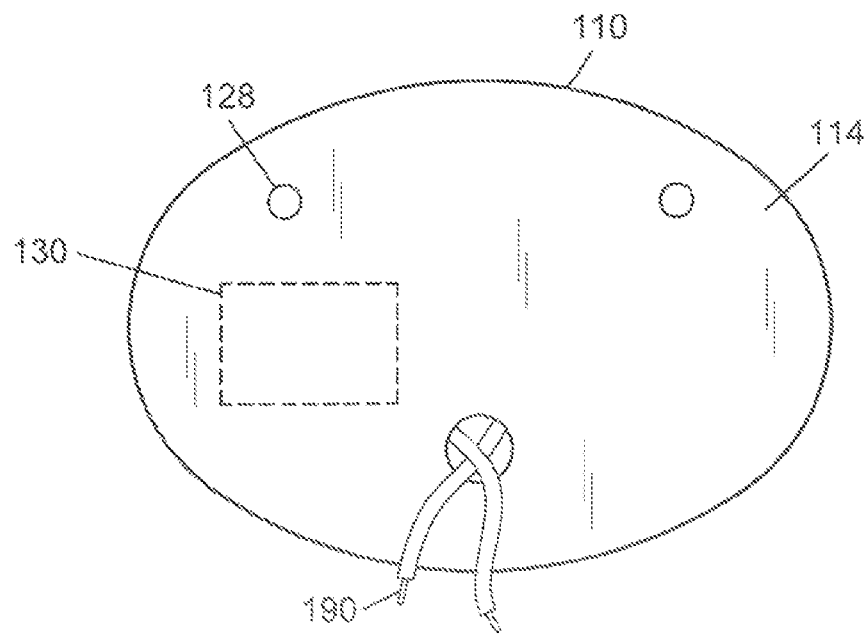
FIG. 2 is a back view of the system of the present invention.
Figure 3:
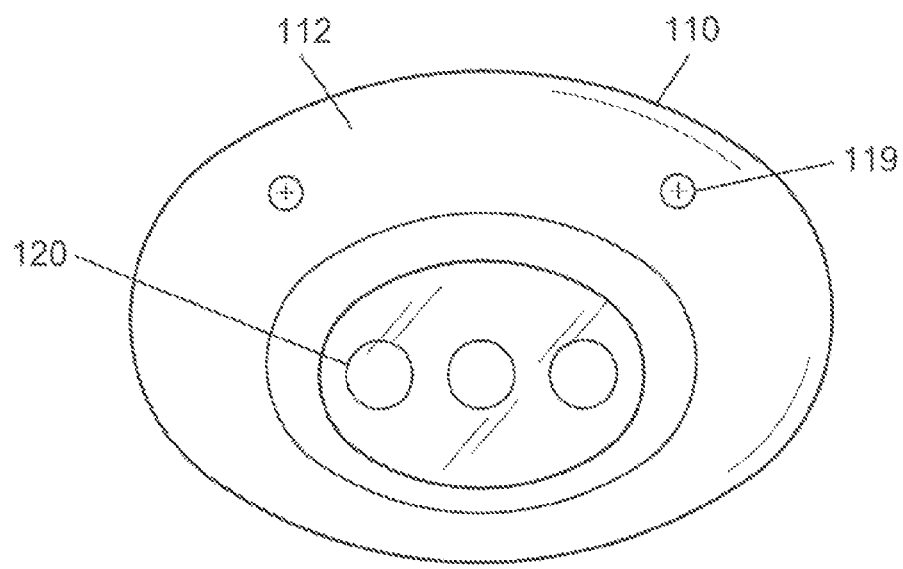
FIG. 3 is a front view of the system of the present invention.
Figure 4:
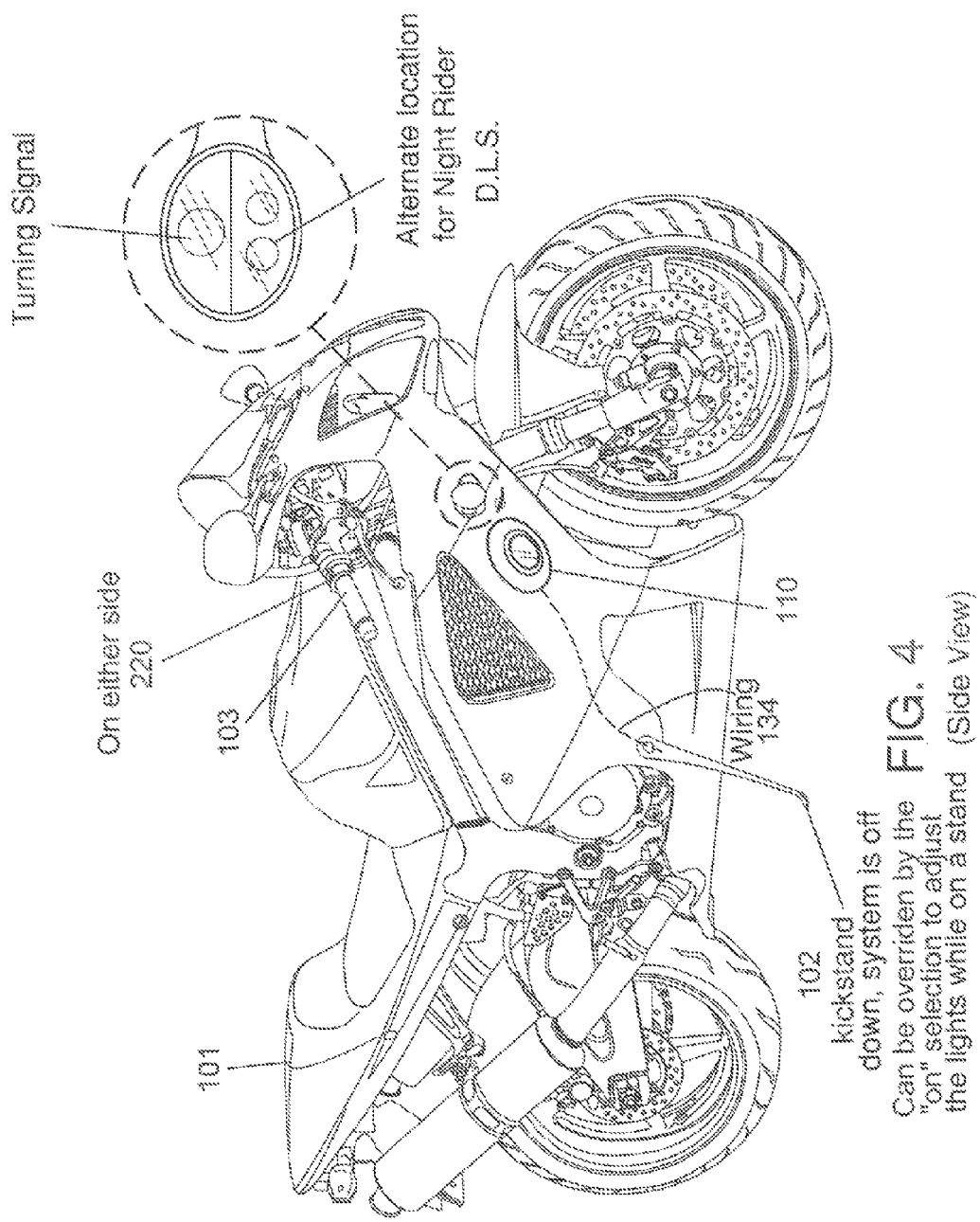
FIG. 4 is a side in-use view of the system of the present invention.
Figure 5:
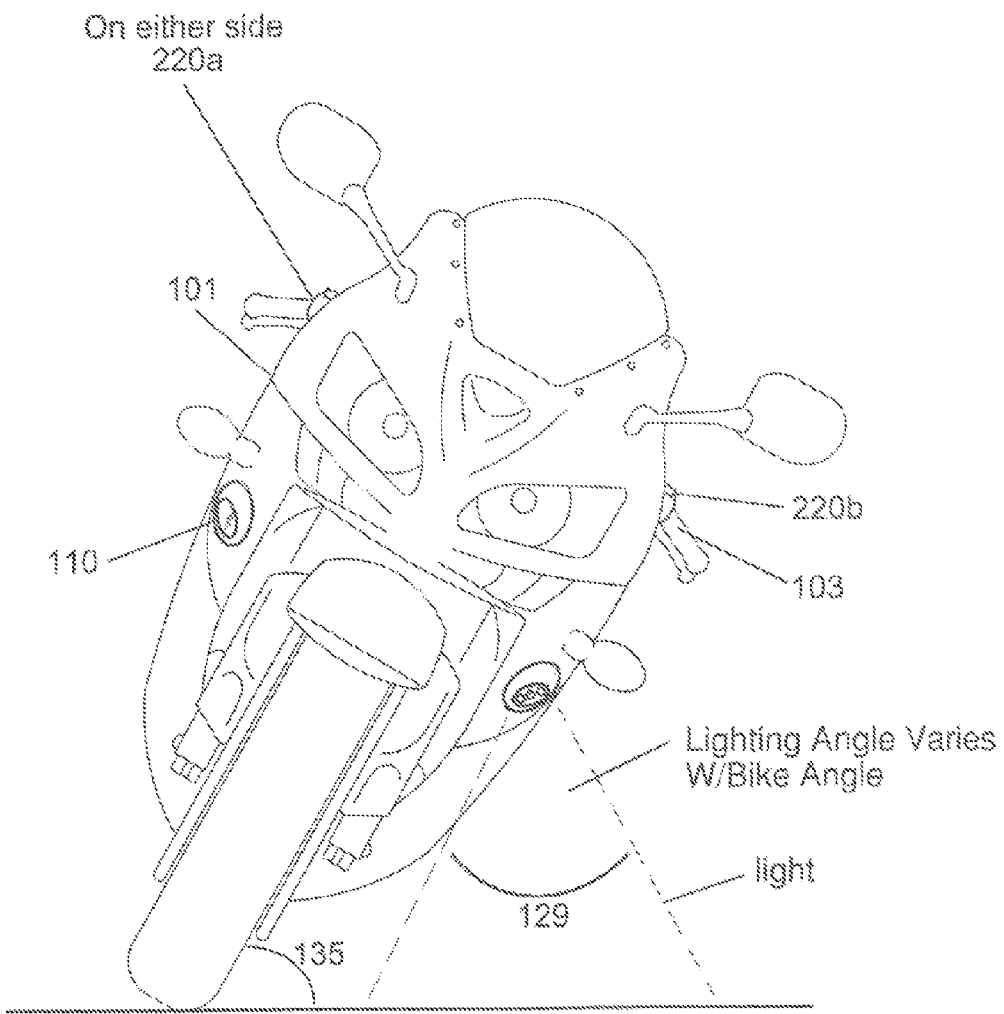
FIG. 5 is a front in-use view of the system of the present invention.
Figure 6:
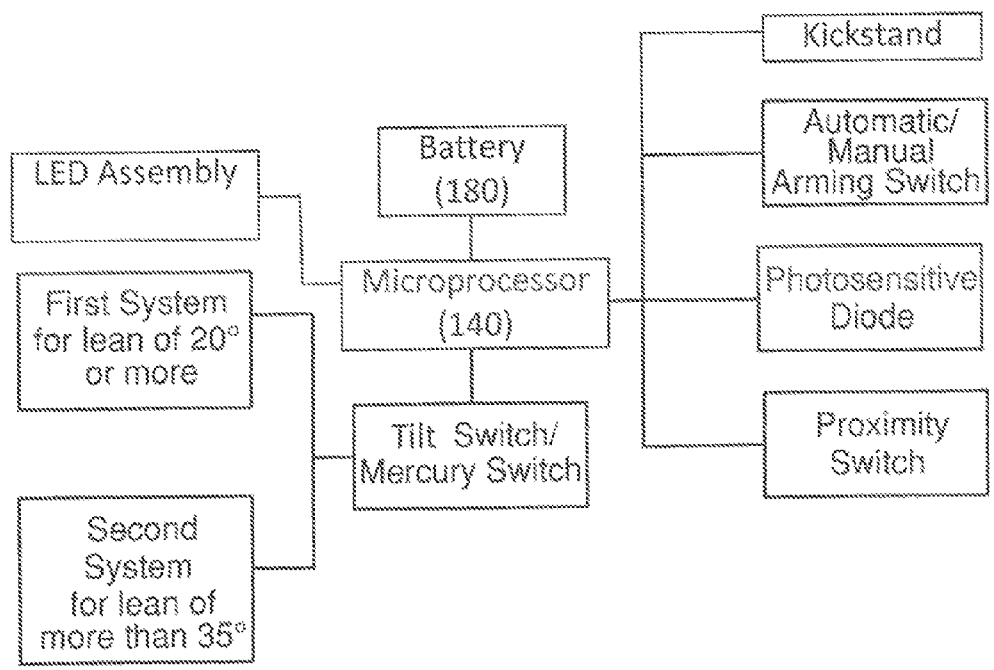
FIG. 6 is a schematic view of the electrical components of the system of the present invention.

The system 100 comprises a light base 110 having a front surface 112 a back surface 114, and an inner cavity. In some embodiments, the light base 110 is oval in shape as shown in FIG. 1. However the light base 110 is not limited to this shape. A light component 120 (e.g., light emitting diode (LED)) is disposed in the front surface 112 of the light base 110. As shown in FIG. 1, one or more setscrews 119 may be used to construct the light base 110. As shown in FIG. 2, one or more mounting holes 128 are disposed in the back surface 114 of the light base 110. The mounting holes 128 allow the light base 110 to be mounted to a motorcycle 101 in a standard manner. For example, as shown in FIG. 4, the light base 110 may be mounted to the side of the motorcycle (e.g., near the front wheel, near the turning signal, etc.).

Disposed in the inner cavity of the light base 110 is a tilt sensor 130 (e.g., digital electronic tilt sensor) that is adapted to detect tilting of the motorcycle 101 (e.g., a tilt angle 135). Tilt sensors are well known to one of ordinary skill in the art. In some embodiments, the tilt sensor 130 is adapted to detect a first tilt angle of between about 20 to 35 degrees and a second tilt angle of more than about 35 degrees.

The system 100 further comprises a microprocessor 140 disposed in the light base 110 and operatively connected to the tilt sensor 130. The microprocessor 140 is operatively connected to the light component 120.

The system 100 further comprises a first switch base 210a with a first arming switch 220a that can move between an on position and an off position (and optionally an armed position). The first switch base 210a can be mounted to a handlebar 103 of the motorcycle 101 as shown in FIG. 4. In some embodiments, the system 100 further comprises a second switch base 210b with a second arming switch 220b that can move between an on position and an off position (and optionally an armed position). The second switch base 210b can be mounted to the other handlebar 103 of the motorcycle 101. The arming switches 220 are each operatively connected to the microprocessor 140 via wiring 190 (e.g., see FIG. 1). When the switches 220 are in the on position, the system 100 is activated. When the switches 220 are in the off position, the system 100 is deactivated.

In some embodiments, the system 100 further comprises a power source (e.g., a battery 180) operatively connected to the microprocessor 140.

In some embodiments, the microprocessor 140 is operatively connected to the kickstand 102 of the motorcycle 101 via wiring 134. In some embodiments, when the kickstand 102 is down, the system 100 is deactivated. In some embodiments, when the kickstand 102 is up, the system 100 is activated. In some embodiments, the kickstand 102 integration is overridden when the switch 220 is in the on position.

In some embodiments, the system 100 is integrated into the turn signal system such that when the turn signal is activated the system 100 is activated and when the turn signal is deactivated the system 100 is deactivated.

In some embodiments, the lighting angle varies. For example, the greater the tilt of the motorcycle, the wider the lighting angle. In some embodiments, for example if the tilt of the motorcycle is between about 20 to 35 degrees, the beam of light produced from the light component 120 is projected at an angle between about 30 to 35 degrees. In some embodiments, for example when the tilt of the motorcycle 101 is greater than about 35 degrees, the beam of light produced from the light component 120 is projected at an angle of about 40 degrees.

The disclosures of the following U.S. Patents are incorporated in their entirety by reference herein: U.S. Pat. No. 4,024,388; U.S. Pat. No. 4,363,022; U.S. Pat. No. 4,583,152; U.S. Pat. No. 4,868,720; U.S. Design Patent No. D355269; U.S. Pat. No. 5,426,571; U.S. Pat. No. 6,595,666; U.S. Pat. No. 7,055,993; U.S. Patent Application No. 2005/0024884; U.S. Patent Application No. 2005/0169001.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A secondary lighting system (100) for providing light to a motorcycle (101) when the motorcycle (101) tilts in a turn, said system (100) comprising:
   (a) a light base (110) having a front surface (112) and a back surface (114) and an inner cavity;
   (b) a light component (120) disposed in the front surface (112) of the light base (110);
   (c) a tilt sensor (130) disposed in the inner cavity of the light base (110), the tilt sensor (130) is adapted to detect a tilt angle (135) of a motorcycle (101);
   (d) a microprocessor (140) disposed in the inner cavity of the light base (110), the microprocessor (140) is operatively connected to the tilt sensor (130) and to the light component (120);

wherein when the tilt sensor (130) detects a tilt angle (135) that is greater than a pre-programmed first threshold the tilt sensor (130) sends a first input signal to the microprocessor (140) whereupon the microprocessor (140) sends a first output command to the light component (120) to activate the light component (120), the light component (120) emits light at a first lighting angle (129);

wherein when the tilt sensor (130) detects a tilt angle (135) that is greater than a pre-programmed second threshold the tilt sensor (130) sends a second input signal to the microprocessor (140) whereupon the microprocessor (140) sends a second output command to the light component (120) to activate the light component (120), the light component (120) emits light at a second lighting angle, the second lighting angle being larger than the first lighting angle (129).

2. The system (100) of claim 1, wherein the light component (120) is a light emitting diode (LED).

3. The system (100) of claim 1, wherein the first threshold is between about 15 to 20 degrees.

4. The system (100) of claim 1, wherein the first threshold is between about 20 to 25 degrees.

5. The system (100) of claim 1, wherein the first threshold is between about 25 to 30 degrees.

6. The system (100) of claim 1, wherein the first threshold is between about 30 to 35 degrees.

7. The system (100) of claim 1, wherein the second threshold is about 35 degrees.

8. The system (100) of claim 1, wherein the second threshold is about 40 degrees.

9. The system (100) of claim 1, wherein the first lighting angle is between about 20 to 35 degrees.

10. The system (100) of claim 1, wherein the second lighting angle is about 40 degrees.

11. The system (100) of claim 1 further comprising a first switch base (210a) with a first arming switch (220a) that can move between at least an on position and an off position, the first arming switch (220a) is operatively connected to the microprocessor (140), wherein when the first arming switch (220a) is in the on position the system (100) is activated and when the first arming switch (220a) is in the off position the system (100) is deactivated.

12. The system (100) of claim 1, wherein the light base (110) is mounted to a side of a motorcycle (101).

13. The system (100) of claim 1, wherein the light component (120) is a light emitting diode (LED).

14. The system (100) of claim 1, wherein the first threshold is between about 15 to 25 degrees.

15. The system (100) of claim 1, wherein the first threshold is between about 25 to 35 degrees.

16. The system (100) of claim 1, wherein when the tilt sensor (130) detects a tilt angle (135) that is greater than a pre-programmed first threshold the tilt sensor (130) sends a first input signal to the microprocessor (140) whereupon the microprocessor (140) sends a first output command to the light component (120) to activate, the light component (120), the light component (120) emits light at a first lighting angle (129).

17. The system (100) of claim 16, wherein the first lighting angle is between about 20 to 35 degrees.

18. The system (100) of claim 16, wherein when the tilt sensor (130) detects a tilt angle (135) that is greater than a pre-programmed second threshold the tilt sensor (130) sends a second input signal to the microprocessor (140) whereupon the microprocessor (140) sends a second output command to the light component (120) to activate the light component (120), the light component (120) emits light at a second lighting angle, the second lighting angle being larger than the first lighting angle.

19. The system (100) of claim 18, wherein the second lighting angle is about 40 degrees.

20. A secondary lighting system (100) for providing light to a motorcycle (101) when the motorcycle (101) tilts in a turn, said system (100) comprising:
  (a) a light base (110) having a front surface (112) and a back surface (114) and an inner cavity;
  (b) a light component (120) disposed in the front surface (112) of the light base (110);
  (c) a tilt sensor (130) disposed in the inner cavity of the light base (110), the tilt sensor (130) is adapted to detect a tilt angle (135) of a motorcycle (101);
  (d) a microprocessor (140) disposed in the inner cavity of the light base (110), the microprocessor (140) is operatively connected to the tilt sensor (130) and to the light component (120);

wherein when the tilt sensor (130) detects a tilt angle (135) that is greater than a pre-programmed first threshold the tilt sensor (130) sends a first input signal to the microprocessor (140) whereupon the microprocessor (140) sends a first output command to the light component (120) to activate the light component (120).

* * * * *